(12) United States Patent
Lin

(10) Patent No.: US 8,422,711 B2
(45) Date of Patent: Apr. 16, 2013

(54) SPEAKER BOX ASSEMBLY

(75) Inventor: Chen-Che Lin, Keelung (TW)

(73) Assignee: Go-Rock Technology Co., Ltd., Hsin Tien, Taipei Hsien (TW)

( * ) Notice: Subject to any disclaimer, the term of this patent is extended or adjusted under 35 U.S.C. 154(b) by 618 days.

(21) Appl. No.: 12/685,291

(22) Filed: Jan. 11, 2010

(65) Prior Publication Data
US 2011/0170724 A1    Jul. 14, 2011

(51) Int. Cl.
*H04R 1/02* (2006.01)
(52) U.S. Cl.
USPC .............. 381/332; 381/87; 381/386; 381/384
(58) Field of Classification Search .................. 381/332, 381/182, 87, 387, 394, 345, 386, 384; 181/198, 181/191
See application file for complete search history.

(56) References Cited

U.S. PATENT DOCUMENTS 5,422,957 A * 6/1995 Cummins ..................... 381/384
7,356,362 B2 * 4/2008 Chang et al. ............... 455/575.2
2007/0086613 A1 * 4/2007 Chang et al. .................. 381/333
2007/0280488 A1 * 12/2007 Chia-Hung ................... 381/94.3
2008/0080732 A1 * 4/2008 Sneed .......................... 381/374

FOREIGN PATENT DOCUMENTS

DE     20 2005 017 032 U1    2/2006
DE        202005017032 U1 *  2/2006

OTHER PUBLICATIONS

European Search Report.

* cited by examiner

*Primary Examiner* — Disler Paul
(74) *Attorney, Agent, or Firm* — Muncy, Geissler, Olds & Lowe, PLLC

(57) ABSTRACT

A speaker box assembly includes two speaker boxes, two line-winding means, a switch, and a power supply unit. Each of the two speaker boxes is provided on its surface with an outlet hole. One of the two speaker boxes is provided on its surface with a connector jack. The two line-winding means are provided in the two speaker boxes respectively. Each of the line-winding means has a line-winding box and an electrical line. The line-winding box is located inside the speaker box. The inner end of the electrical line is connected to the line-winding box, and the outer end of the electrical line is connected to a connector member. The connector member and the electrical line pass through the outlet hole selectively. The connector member in one of the speaker boxes is inserted into the connector jack on the other of the speaker boxes.

8 Claims, 6 Drawing Sheets

SPEAKER BOX ASSEMBLY

BACKGROUND OF THE INVENTION

1. Field of the Invention

The present invention relates to a speaker assembly, and in particular to a speaker box assembly capable of storing electrical lines.

2. Description of Related Art

Please refer to FIG. 1, in which an assembled perspective view showing a conventional speaker box assembly is demonstrated. The speaker box assembly includes at least two speaker boxes 1a, an electrical line 2a, and an electrical power line 3a. Both ends of the electrical line 2a are connected to the speaker boxes 1a respectively. The electrical power line 3a is connected to one of the speaker boxes 1a for transmitting electrical power to the speaker boxes 1a.

In the above-mentioned conventional speaker box assembly, however, the length of the electrical line 2a exposed to the outside is unchangeable. Thus, the electrical line 2a exposed to the outside cannot be stored easily, which makes the whole speaker box assembly untidy. Further, the electrical line 2a of a fixed length may restrict the degree of freedom in arranging the speaker boxes 1a, which makes it difficult for a user to arrange the speaker box assembly in a desired space.

In order to overcome the problems of the above-mentioned speaker box assembly, the present inventor proposes a novel and reasonable structure based on his delicate researches and expert experiences.

SUMMARY OF THE INVENTION

An objective of the present invention is to provide a speaker box assembly, in which the electrical line connected between the two speaker boxes can be stored. In this way, the problem of uneasy storage and untidiness caused by the electrical line exposed to the outside can be overcome.

Another objective of the present invention is to provide a speaker box assembly, in which the length of the electrical line between the two speaker boxes can be changed, thereby solving the problem that the degree of freedom in arranging the speaker boxes is restricted by the electrical line of a fixed length. Thus, the user can arrange the speaker box assembly in a desired space.

A further objective of the present invention is to provide a speaker box assembly, in which the electrical line can be disconnected from the two speaker boxes, thereby solving the problem that both ends of the electrical line still have to be connected with the two speaker boxes respectively when the speaker box assembly is not in use.

To achieve the above objectives, the present invention provides a speaker box assembly, comprising: two speaker boxes each having an outlet hole and a line-winding means, the outlet hole being provided on surfaces of the two speaker boxes, the line-winding means being disposed inside the speaker boxes respectively, each of the line-winding means having an electrical line, an outer end of the electrical line being connected to a connector member, the connector member and the electrical line passing through the outlet hole selectively, a connector jack being provided on a surface of one of the two speaker boxes, the connector jack being connected to the connector member on the other one of the two speaker boxes; a switch being provided on one of the two speaker boxes; and a power supply unit being disposed in one of the two speaker boxes.

In order to further understand the characteristics and technical contents of the present invention, a description relating thereto will be made with reference to the accompanying drawings. However, the drawings are illustrative only but not used to limit the present invention.

DETAILED DESCRIPTION OF THE PREFERRED EMBODIMENTS

Figure 1:
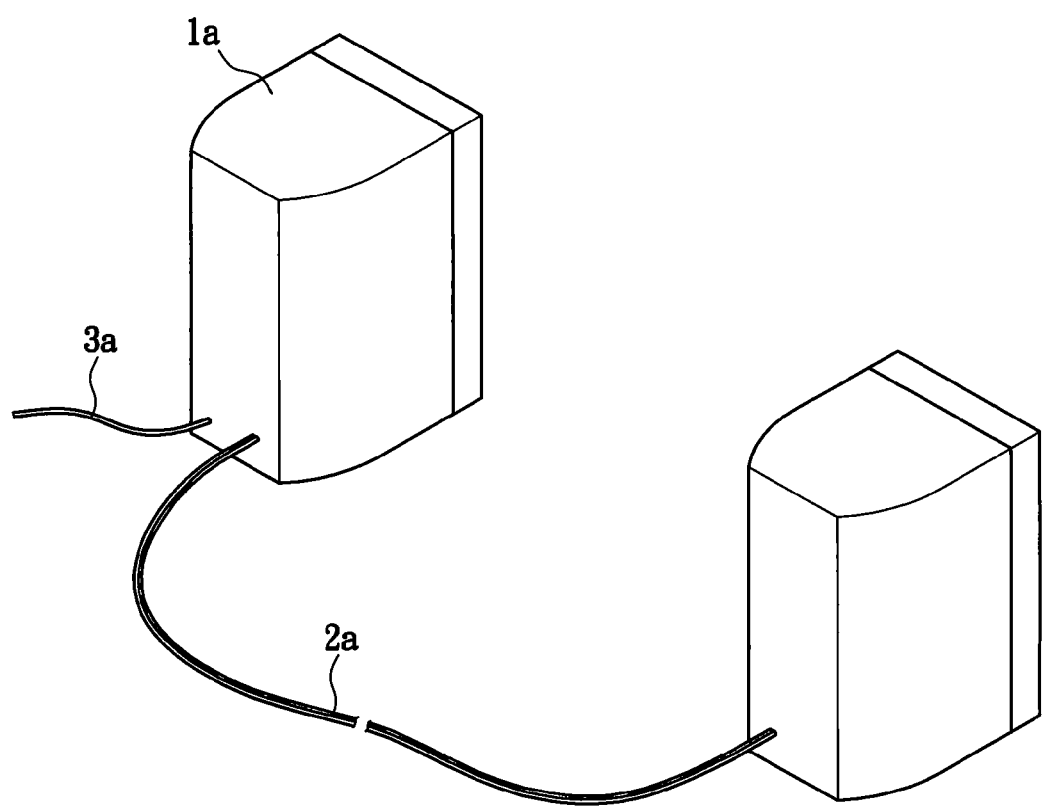
FIG. 1 is an assembled perspective view showing a conventional speaker box assembly.

The present invention is to provide a speaker box assembly, whereby an electrical line connected between two speaker boxes can be stored, the length of the electrical line between the two speaker boxes can be changed, and the electrical line can be selectively connected to or disconnected from the two speaker boxes.

Please refer to FIGS. 2 to 5. The present invention provides a speaker box assembly, which includes two speaker boxes 1, 2, two line-winding means 14, 24, a switch 112, and a power supply unit 17. The two speaker boxes 1, 2 have a base 11, 21, an audio amplifier section 12, 22 and an elastic body 13, 23, respectively.

Figure 2:
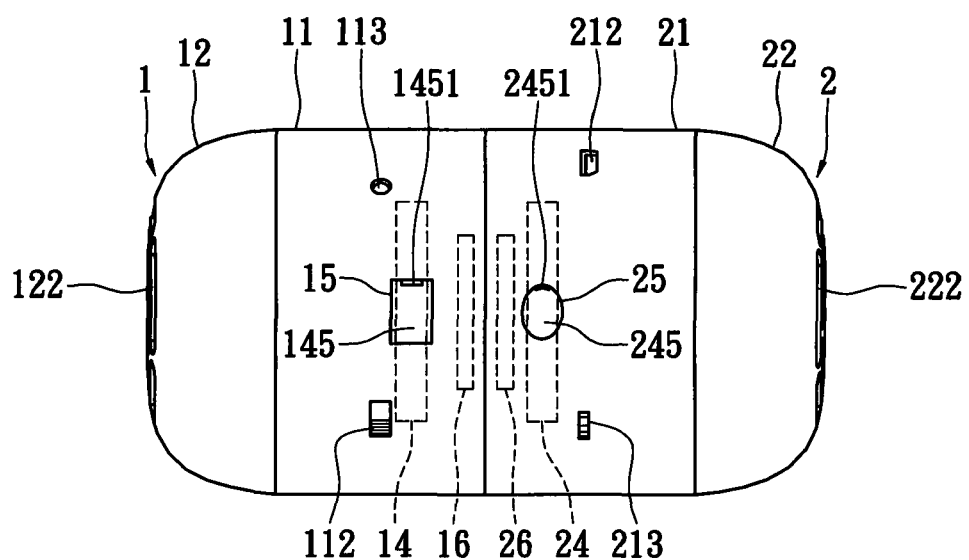
FIG. 2 is a plan view showing a speaker box assembly of the present invention.
Figure 3:
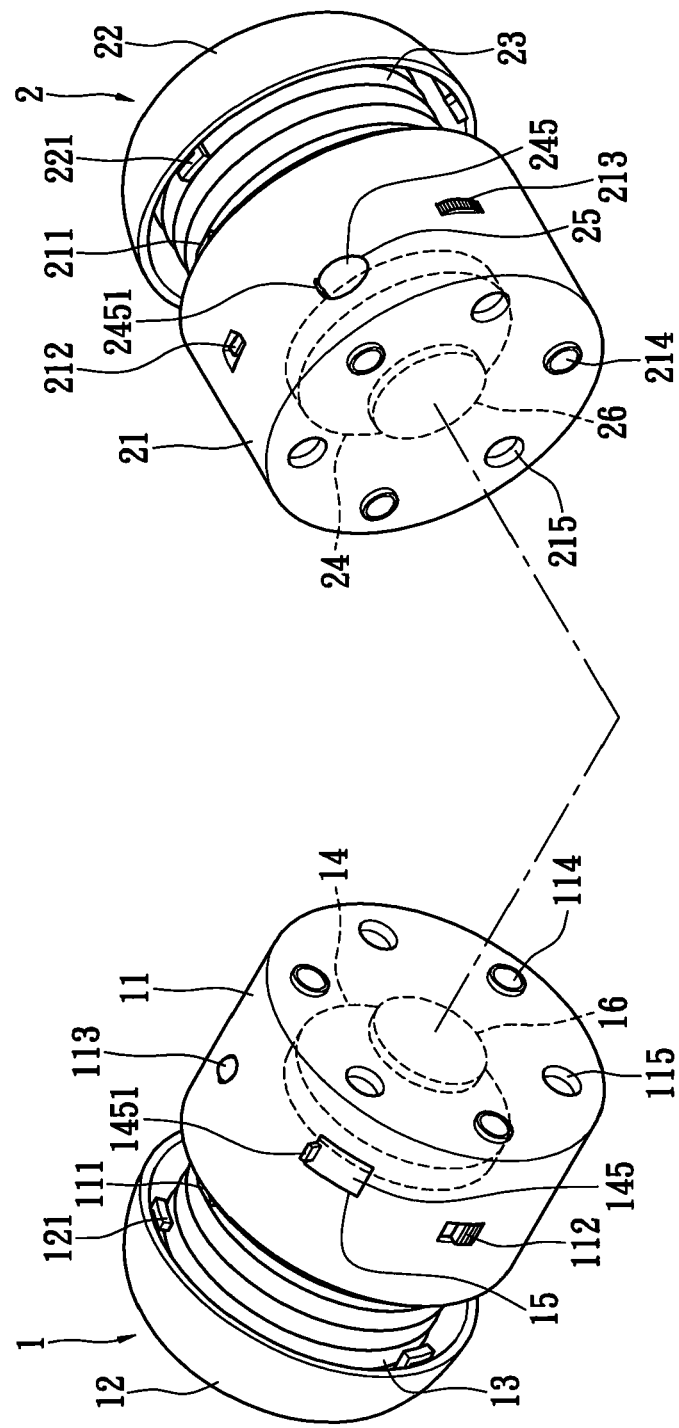
FIG. 3 is an exploded perspective view showing the speaker box assembly of the present invention.
Figure 5:
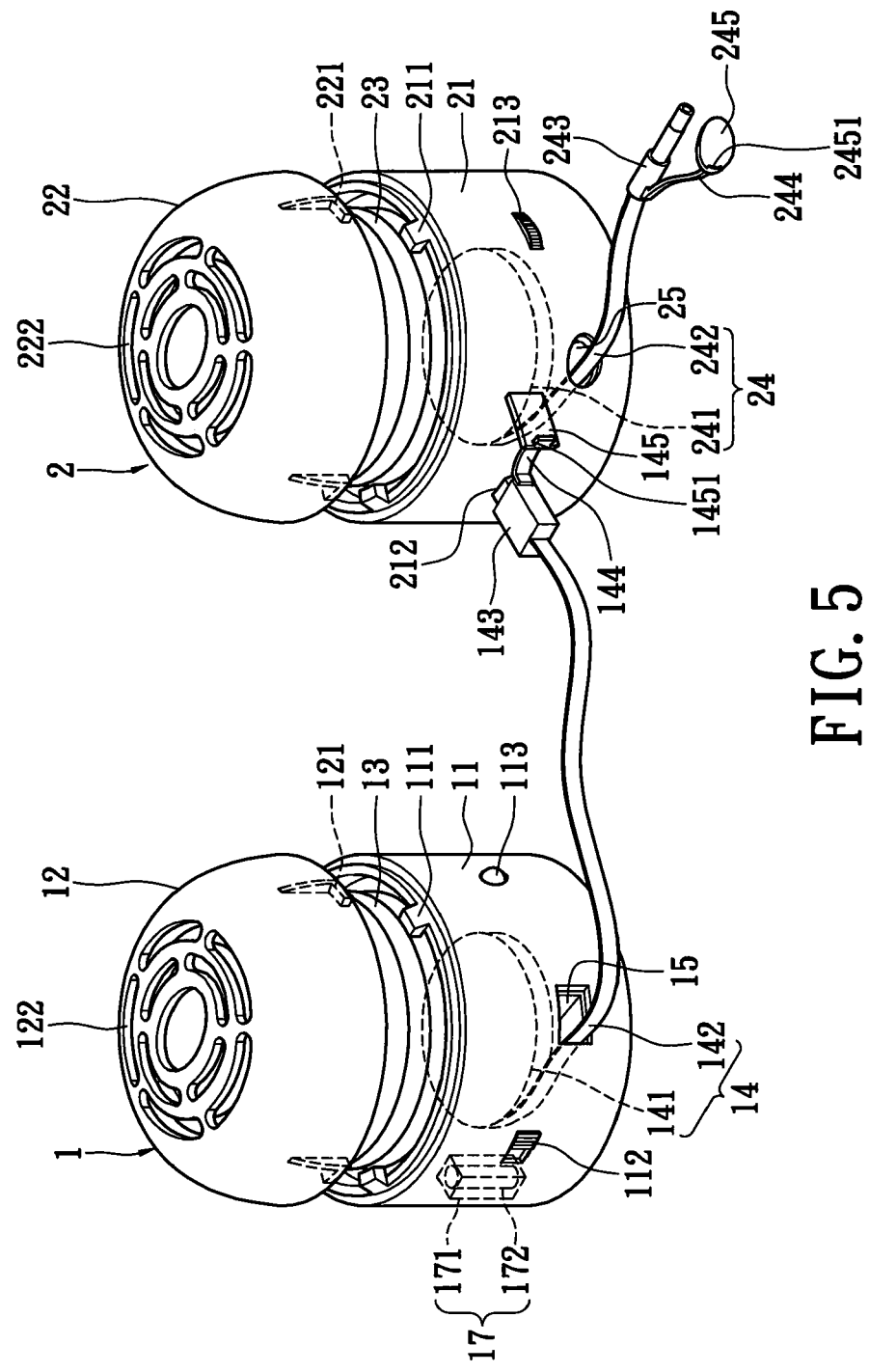
FIG. 5 is a perspective view showing an operating state of the speaker box assembly of the present invention.
Figure 6:
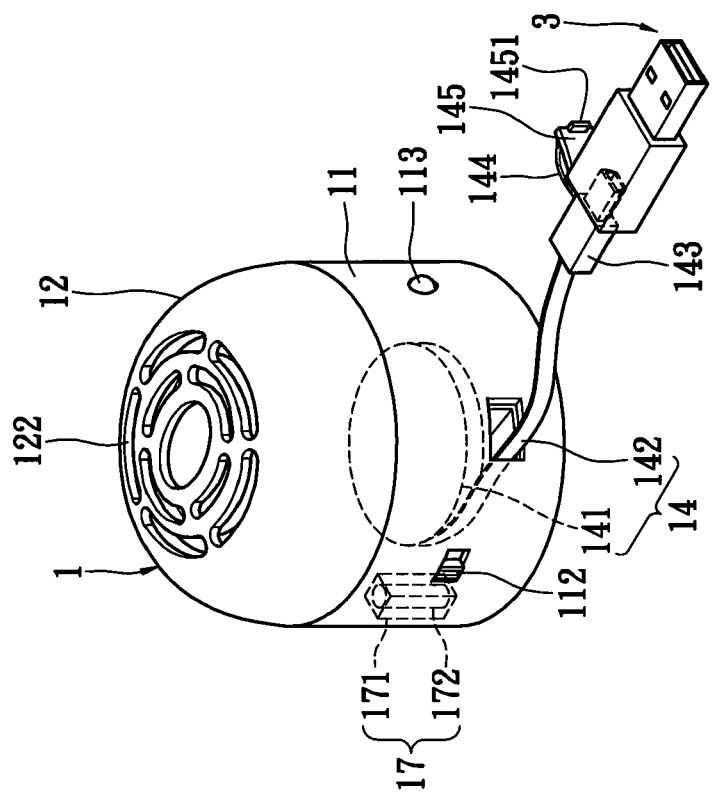
FIG. 6 is a perspective view showing a charging state of the speaker box assembly of the present invention.

Please refer to FIGS. 3 and 5. The speaker box 1 is substantially cylindrical. The elastic body 13 is located between the base 11 and the audio amplifier section 12. The elastic body 13 is made of plastic materials and can be an elastic bellow. A plurality of locking pieces 111 and 121 are disposed on peripheries of the exterior surfaces facing towards to each other in accordance with the base 11 and the audio amplifier section 12. The locking pieces 111 are protrusions protruding toward the central axis of the cylindrical speaker box 1. The bottom of the locking piece 111 is planar. Each of the locking pieces 121 is formed into an L shape. A user can press the audio amplifier section 12 toward the base 11 until the bottom of the locking pieces 121 is located below the bottom of the locking pieces 111. Then, the user rotates the audio amplifier section 12 to make the bottom of the locking pieces 121 to be locked with the bottom of the locking pieces 111, thereby reducing the distance between the base 11 and the audio amplifier section 12 as shown in FIG. 2. Similarly, the speaker box 2 is cylindrical. The elastic body 23, the locking pieces 211 of the base 21, and the locking pieces 221 of the audio amplifier section 22 have the same functions and structures as those of the speaker box 1. Further, the top surfaces of the audio amplifier sections 12 and 22 have a plurality of audio penetration holes 122 and 222. The bottom surfaces of the base 11 and 21 are circular and both of them have the same bottom area.

Figure 4:
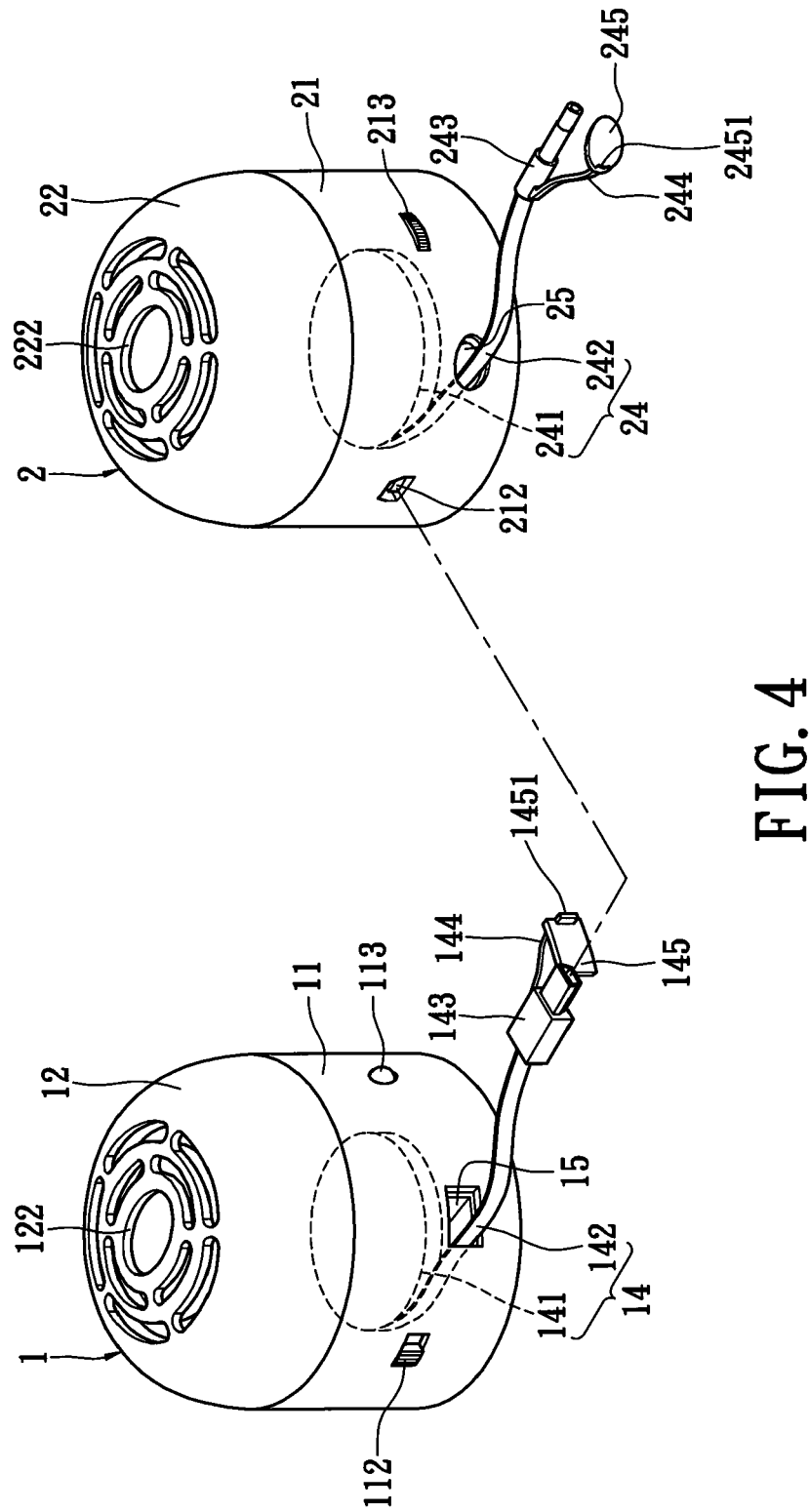
FIG. 4 is a perspective view showing the speaker box assembly of the present invention.

Please refer to FIGS. 2 to 4. The base 11 has a warning lamp 113, protrusions 114, recesses 115, an outlet hole 15, and a magnet 16. The base 21 further has a connector jack 212, a wheel 213, protrusions 214, recesses 215, an outlet hole 25, and a magnet 26.

The switch 112 and the warning lamp 113 are provided on the outer surface of the base 11. The user can turn on or turn off the switch 112 to activate or de-activate the present invention. The warning lamp 113 emits light to indicate that the present invention is in use. In the present embodiment, when the switch 112 is turned to the left, it means that the present invention is not in use, and the warning lamp 113 will not emit light. The connector jack 212 and the wheel 213 are provided on the outer surface of the base 21. The wheel 213 is formed into a disk. A portion of the wheel 213 is inserted into the base 21. The user can rotate the wheel 213 to adjust the volume generated by the speaker box 1 according to the present invention.

The magnets 16 and 26 are provided within the base 11 and 21 respectively adjacent to the bottom thereof. The magnetic pole on the bottom surface of the magnet 16 is reverse to that on the bottom surface of the magnet 26, so that the bottom of the base 11 can be attracted to the bottom of the base 21. Please refer to FIG. 3, the bottom surface of the base 11 is provided with a plurality of protrusions 114 and recesses 115. The bottom surface of the base 21 is provided with a plurality of protrusions 214 and recesses 215. In the present embodiment, there are three protrusions 114 and three recesses 115 that are arranged at intervals to form six apexes of a regular hexagon. Similarly, on the base 21, there are three protrusions 214 and three recesses 215 that are arranged at intervals to form six apexes of a regular hexagon. The protrusions 114 correspond to the recesses 215. The recesses 115 correspond to the protrusions 214. If the bottom surfaces of the bases 11 and 21 face to each other and the base 11 is close to the base 21, the bases 11 and 21 will be connected to each other because of the magnetic attracting force between the magnets 16 and 26. The protrusions 114 can be inserted into the recesses 115, so that the bottom surface of the base 11 can be adhered to the bottom surface of the base 21 completely. Of course, if one of the magnets 16 and 26 is replaced by an iron piece (not shown), the same effect can be also achieved. Further, the protrusions 114 and 214 can be made by rubber.

Each of the line-winding means 14, 15 has a line-winding box 141, 241, and an electrical line 142, 242. The line-winding box 141, 241 is located above the magnet 16, 26 respectively. The outlet hole 15 of the base 11 is in a rectangular shape, and the outlet hole 25 of the base 21 is in an oval shape.

The line-winding box 141 has a reel and a coil spring (not shown). The coil spring is provided on the reel. The inner end of the electrical line 142 is connected to the reel. The coil spring generates a recovering force, so that the electrical line 142 can be wound on the reel, thereby storing the electrical line 142 or control the length of the electrical line 142. The outer end of the electrical line 142 is connected to a connector member 143. The connector member 143 and the electrical line 142 pass through the outlet hole 15 selectively. As shown in FIG. 4, one side of the connector member 143 extends to form a covering strip 144. One end of the covering strip 144 is formed with a covering member 145. The shape and size of the covering member 145 are similar to those of the rectangular outlet hole 15. When the electrical line 142 and the connector member 143 are stored, the recovering force generated by the coil spring can make the covering member 144 to cover the outlet hole 15 as shown in FIG. 2. A protruded portion formed on the outer surface of the covering member 145 is treated as a pulling member 1451, whereby the user can pull the electrical line 142 and the connector member 143 out of the speaker box 1.

The line-winding box 241 has a reel and a coil spring (not shown). The coil spring is provided on the reel. The inner end of the electrical line 242 is connected to the reel. The coil spring generates a recovering force, so that the electrical line 242 can be wound on the reel, thereby storing the electrical line 242 or control the length of the electrical line 242. The outer end of the electrical line 242 is connected to a connector member 243. The connector member 243 and the electrical line 242 pass through the outlet hole 25 selectively. As shown in FIG. 4, one side of the connector member 243 extends to form a covering strip 244. One end of the covering strip 244 is formed with a covering member 245. The shape and size of the covering member 245 are similar to those of the oval outlet hole 25. When the electrical line 242 and the connector member 243 are stored, the recovering force generated by the coil spring can make the covering member 244 to cover the outlet hole 25 as shown in FIG. 2. A protruded portion formed on the outer surface of the covering member 245 is considered as a pulling member 2451, whereby the user can pull the electrical line 242 and the connector member 243 out of the speaker box 2.

The power supply unit 17 is configured to supply electrical power to the speaker boxes 1 and 2, which can be an external power transmission line (not shown) or a built-in battery box 171. In the present embodiment, as shown in FIG. 5, the power supply unit 17 is a battery box in which a rechargeable battery 172 is disposed. The battery box 171 is located inside the base 11.

When the present invention is in use, as shown in FIG. 5, the speaker boxes 1 and 2 are separated from each other and the bottom surfaces of the bases 11 and 12 are not in direct contact with a table surface (not shown). Instead, the protrusions 114, 214 are brought into contact with the table surface, so that the bottom surfaces of the bases 11 and 12 will not scrape the table surface. Further, the protrusions 114, 214 are made by rubber, so that they can prevent the speaker boxes 1 and 2 from slipping easily.

The user inserts the front end of the connector member 143 of the speaker box 1 into the connector jack 212 of the speaker box 2, and inserts the front end of the connector member 243 of the speaker box 2 into a sound source (not shown). Then, the user turns on the switch 112, so that the power supply unit 243 is in function and the warning lamp 113 emits light. Electromagnetic waves (not shown) coming from the sound source are transmitted into the speaker box 2 through the connector member 243 and the electrical line 242. Then, the electromagnetic waves are transmitted in the speaker box 1 through the connector member 143 and the electrical line 14. Meanwhile, a portion of the electrical power supplied by the power supply unit 17 is supplied to the speaker box 1 for amplifying and transmitting the sound waves, and the other portion of the electrical power supplied by the power supply unit 17 is supplied to the speaker box 2 through the electrical line 142 and the connector member 143 for amplifying and transmitting the sound waves. If the user wants a better sound effect or external appearance of the present invention, the user can rotate the audio amplifier sections 12, 22 counter-clockwisely (FIG. 5), so that the locking pieces 121, 221 of the audio amplifier sections 12, 22 are separated from the locking pieces 111, 211 of the bases 11, 21. As a result, the elastic bodies 13, 23 that are compressed previously can be extended to increase the distance between the audio amplifier sections 12, 22 and the bases 11, 21. Of course, the present invention can be used in the condition that the bottom surfaces of the bases 11 and 21 are connected to each other due to the magnetic attraction force, thereby reducing the space occupied by the speaker box according to the present invention.

In the present embodiment, the rechargeable battery 172 is disposed in the battery box 171. The front end of the connector member 143 of the speaker box 1 is connected to the one end of an electrical connector 3. The other end of the electrical connector 3 is a USB plug that can be connected to a computer or adapter for charging of the battery 172. The electricity can be transmitted to the rechargeable battery 172 through the connector member 143 and the electrical line 142. Of course, the way of charging the rechargeable battery 172 is not limited thereto.

According to the above, the speaker box assembly of the present invention has advantageous features as follows. Since each of the speaker boxes has a line-winding means, the electrical line and the connector member can be stored in the speaker box when not in use. During operation, the distance between the audio amplifier section and the base can be increased by extending the elastic body, thereby generating a better sound effect or external appearance. When not in use, the connector member in one of the two speaker boxes can be separated from the connector jack of the other speaker box. It is unnecessary for the two speaker boxes to be electrically connected to each other when not in use. Further, the bottoms of the two speaker boxes can be connected to each other by the magnetic attraction force, thereby reducing the space occupied by the present invention.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A speaker box assembly, comprising: two speaker boxes each having an outlet hole and a line-winding means, the outlet hole being disposed on an outer surface of each of the two speaker boxes, the line-winding means being disposed inside each of the two speaker boxes, each of the line-winding, means having an electrical line, an outer end of the electrical line being connected to a connector member, the connector member and the electrical line passing through the outlet hole selectively, an outer surface of one of the two speaker boxes being provided with a connector jack for allowing the connector member on the other speaker box to be inserted therein; a switch, being provided on one of the two speaker boxes; and a power supply unit, being provided in one of the two speaker boxes, wherein each of the speaker boxes has an audio amplifier section, an elastic body, and a base, in which the base and the audio amplifier section are provided with a plurality of locking pieces corresponding to each other for locking the base and the audio amplifier section, and the elastic body is disposed between the base and the audio amplifier section.

2. The speaker box assembly according to claim 1, wherein each of the speaker boxes is provided with at least one magnet with the magnets being magnetically attracted to each other.

3. The speaker box assembly according to claim 2, wherein the at least one magnet is disposed below the speaker box, a plurality of protrusions and recesses are provided below each of the speaker boxes, and the recesses and protrusions of one of the speaker boxes correspond to the protrusions and recesses of the other of the speaker boxes respectively.

4. The speaker box assembly according to claim 1, wherein one of the two speaker boxes is provided with at least one magnet, the other one of the two speaker boxes is provided with an iron piece, and the magnet and the iron piece are magnetically attracted to each other.

5. The speaker box assembly according to claim 4, wherein the at least one magnet and the iron piece are provided below each of the speaker boxes, a plurality of the protrusions and recesses are provided below each of the speaker boxes, and the recesses and protrusions of one of the speaker boxes correspond to the protrusions and recesses of the other of the speaker boxes respectively.

6. The speaker box assembly according to claim 1, wherein the power supply unit is a battery box.

7. The speaker box assembly according to claim 6, wherein a rechargeable battery is disposed in the battery box, and the battery box and the connector member corresponding to the connector jack are disposed in the same speaker box.

8. The speaker box assembly according to claim 1, wherein one side of each of the speaker boxes extends to form a covering strip, one end of the covering strip is formed with a covering member, the covering member is shaped and dimensioned to be substantially identical to the outlet hole corresponding thereto, and an protruded portion formed on an outer surface of the covering member is considered as a pulling member.

* * * * *